United States Patent
Roberts et al.

(10) Patent No.: US 8,155,698 B2
(45) Date of Patent: Apr. 10, 2012

(54) SYSTEM AND METHOD FOR STORING AND DISPLAYING DATA WITH DIGITAL IMAGES

(75) Inventors: Michael Aaron Roberts, Overland Park, KS (US); Shekhar Gupta, Overland Park, KS (US); Anthony James Zerillo, Kansas City, MO (US)

(73) Assignee: Embarq Holdings LLC, Overland Park, KS (US)

( * ) Notice: Subject to any disclaimer, the term of this patent is extended or adjusted under 35 U.S.C. 154(b) by 479 days.

(21) Appl. No.: 12/410,994

(22) Filed: Mar. 25, 2009

(65) Prior Publication Data

US 2010/0248777 A1    Sep. 30, 2010

(51) Int. Cl.
*H04M 1/00*    (2006.01)
(52) U.S. Cl. .................................. 455/556.1; 455/566
(58) Field of Classification Search ............... 455/556.1, 455/456.1, 566, 90.3, 550.1, 66.1, 557
See application file for complete search history.

(56) References Cited

U.S. PATENT DOCUMENTS

| | | | |
|---|---|---|---|
| 4,660,185 A * | 4/1987 | French | 367/19 |
| 6,404,898 B1 | 6/2002 | Rhoads | |
| 6,970,185 B2 | 11/2005 | Halverson | |
| 7,233,356 B2 | 6/2007 | Nagao | |
| 7,457,467 B2 | 11/2008 | Dance et al. | |
| 2004/0032514 A1 | 2/2004 | Silverbrook | |
| 2007/0293265 A1 * | 12/2007 | Fei et al. | 455/556.1 |

* cited by examiner

*Primary Examiner* — Joseph Lauture

(57) ABSTRACT

A method for storing data with a digital image comprises providing a digital camera for capturing and storing digital images, the digital camera having a controller, a storage medium, a data entry mechanism, and a positioning system. The method further includes the camera receiving direction from a user to capture a digital image and capturing and storing the digital image in response to the user's direction. Additionally, the positioning system determines location information corresponding to the location of the digital camera when the image is captured. The camera receives user-supplied data input to be associated with the captured digital image captured via the data entry mechanism and the controller automatically associates the user-supplied data input and the location information with the digital image and stores the data input, the location information, and the digital image in the storage medium as a combined data file.

28 Claims, 8 Drawing Sheets

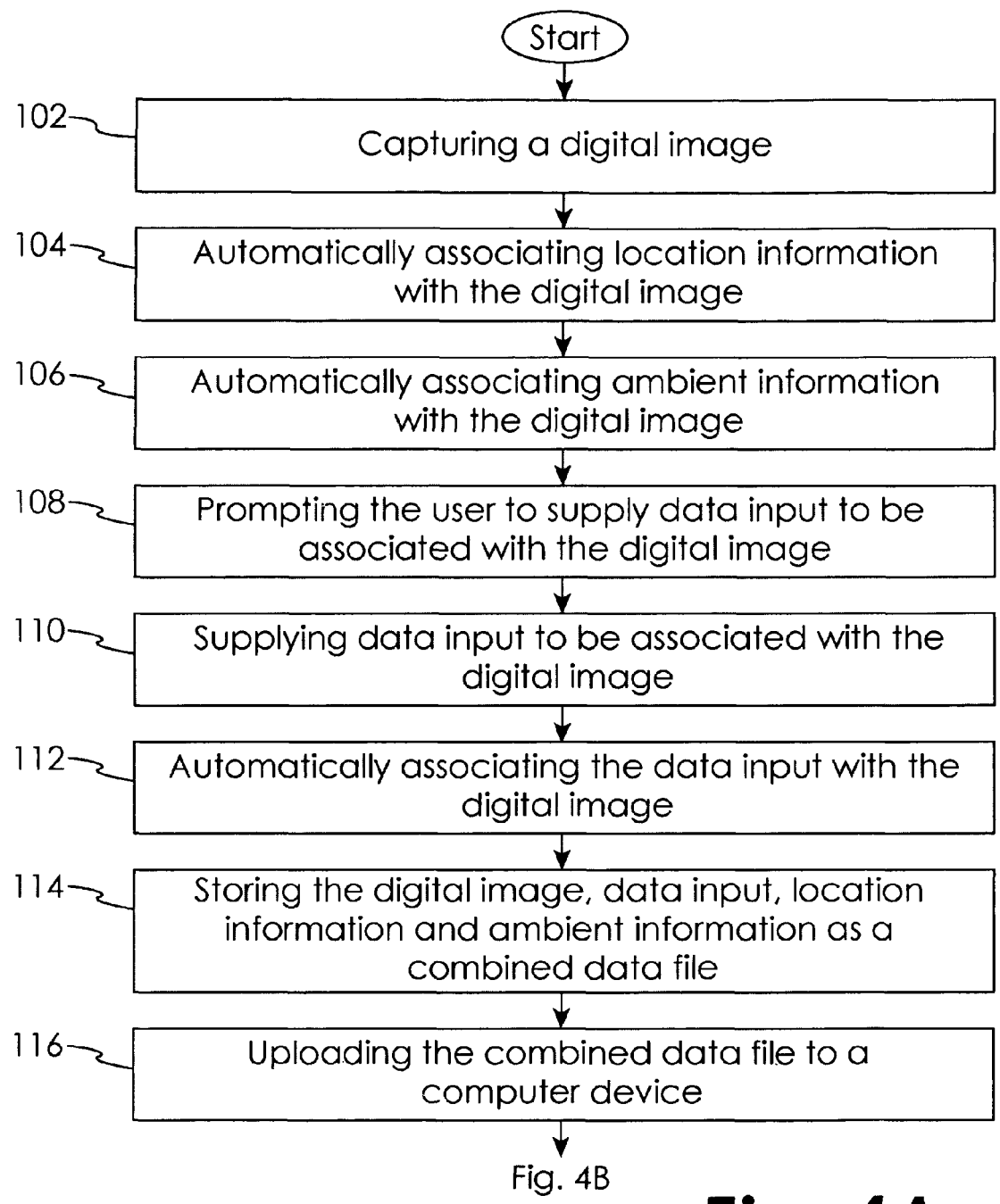

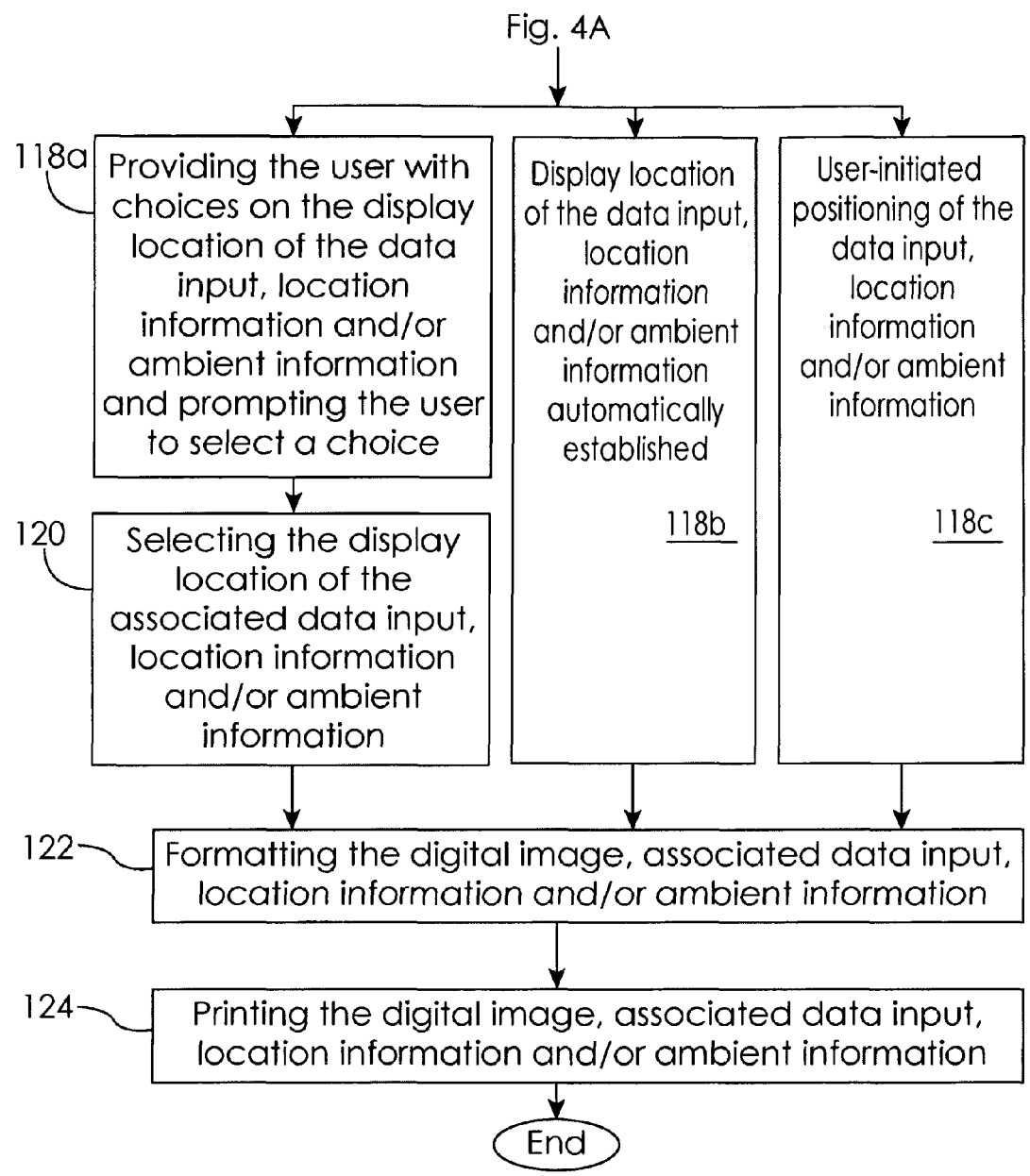

SYSTEM AND METHOD FOR STORING AND DISPLAYING DATA WITH DIGITAL IMAGES

FIELD OF THE INVENTION

The present disclosure relates generally to digital images and more particularly pertains to a system and method for storing and displaying data with digital images.

BACKGROUND OF THE INVENTION

The expanding capabilities and increased accessibility of modern digital technology has allowed it to be used in a variety of applications. One of these applications has been digitally capturing optical images. Once captured by a digital camera device, the digital image can be stored in any digital storage medium, displayed on a digital display device, printed on paper or other medium, manipulated using editing tools, or transmitted to remote locations using any transmission mechanisms appropriate for digital information.

A digital camera component typically contains an on-board processor, which can be programmed to perform a variety of functions. Among other things, the processor can be programmed to associate additional information with a digital image. It is known, for example, to embed the date on which the image was captured with the digital image file. However, it would be desirable to obtain additional, more detailed and/or customized information related to the digital image and associate such information with the digital image for future reference. For example, in hindsight it can often be difficult to remember the particular locations where multiple digital images were captured or other information relevant or of interest to the user at the time the images are captured.

Accordingly, there is a need for systems and methods for storing and displaying data with digital images to address these and other needs.

SUMMARY OF THE INVENTION

In certain embodiments, a method for storing data with a digital image comprises providing a digital camera for capturing and storing digital images, the digital camera having a controller, a storage medium, a data entry mechanism adapted to receive user-supplied data, and a positioning system. The method includes the camera receiving direction from a user to capture a digital image and capturing and storing the digital image in response to the user's direction. The method further includes the positioning system determining location information corresponding to the location of the digital camera when the digital image is captured. Additionally, the method includes the camera receiving user-supplied data input to be associated with the captured digital image via the data entry mechanism and the controller automatically associating the user-supplied data input and the location information with the digital image and storing the data input, the location information, and the digital image in the storage medium as a combined data file.

In certain other embodiments, a method for storing data with a digital image comprises providing a cellular telephone having a controller, a storage medium, and an onboard digital camera component capable of capturing and storing digital images. The method includes the telephone receiving direction from a user to capture a digital image and the digital camera component capturing and storing the digital image in response to the user's direction. Additionally, the method includes the telephone obtaining location-identifying information corresponding to the location of the telephone when the digital image is captured and the telephone receiving user-supplied data input to be associated with the captured digital image. The method further includes the controller automatically associating the user-supplied data input and the location identifying information with the digital image and storing the data input, the location information and the digital image in the storage medium as a combined data file.

In yet other embodiments, a system for storing data with a digital image comprises a digital camera adapted and configured for capturing and storing digital images, the digital camera having a controller, a storage medium, and a data entry mechanism adapted to receive user-supplied data. The camera is operable to obtain location information representing the location of the digital camera at the time a digital image is captured and receive user-supplied data input via the data entry mechanism. The controller is operable to automatically associate the data input and the location information with the digital image and store the data input, the location information, and the digital image in the storage medium as a combined data file. The system further includes a computer device adapted and configured for receiving the combined data file uploaded from the digital camera. The computer device is operable to receive direction from the user for the display location of the data input and location information with respect to the digital image. Additionally, the system includes a printer for printing the digital image with the associated data input and location information on paper.

In even other embodiments, a method for storing data with a digital image comprises providing a digital camera for capturing and storing digital images, the digital camera having a controller, a storage medium, and an ambient sensing system. The method includes the camera receiving direction from a user to capture a digital image and capturing and storing the digital image in response to the user's direction. The method further includes the ambient sensing system determining ambient information corresponding to at least one ambient condition when the digital image is captured. The method also includes the controller automatically associating the ambient information with the digital image and storing the ambient information and the digital image in the storage medium as a combined data file.

In further embodiments, a method for storing data with a digital image comprises providing a digital camera for capturing and storing digital images, the digital camera having a controller, a storage medium, and a positioning system, the camera receiving direction from a user to capture a digital image. The method includes the camera capturing and storing the digital image in response to the user's direction. The method further includes the positioning system determining geographic coordinate information corresponding to the geographic location of the digital camera when the digital image is captured. Additionally, the method includes the digital camera retrieving information representing the nearest landmark based on the geographic coordinate information, and the controller automatically associating the landmark information with the digital image and storing the landmark information and the digital image in the storage medium as a combined data file.

BRIEF DESCRIPTION OF THE DRAWINGS

FIGS. 4A-4B depict a flow chart according to an embodiment of the present disclosure.

DESCRIPTION OF ILLUSTRATED EMBODIMENTS

For the purposes of promoting an understanding of the principles of the disclosure, reference will now be made to the embodiments illustrated and specific language will be used to describe the same. It will nevertheless be understood that no limitation of the scope of the disclosure is thereby intended, such alterations, modifications, and further applications of the principles of the disclosure being contemplated as would normally occur to one skilled in the art to which the disclosure relates.

The present disclosure is generally directed to systems and methods for storing and displaying data with digital images. Customized data input may be supplied by a user and associated with a digital image captured by a digital camera device. Additionally, location, ambient condition, date and/or time information corresponding to the moment the digital image is captured may be obtained by the digital camera device and associated with the digital image. A controller component within the digital camera device may automatically associate the customized data input as well as the location, ambient condition, date and/or time information with the digital image according to protocol stored on the device. The customized data input, the location, ambient condition, date and/or time information and the captured digital image may be stored in the device as a combined data file. In certain embodiments, a user may select how the data input and the location, ambient condition, date and/or time information is displayed with respect to the digital image and print the digital image with the displayed data.

Figure 1:
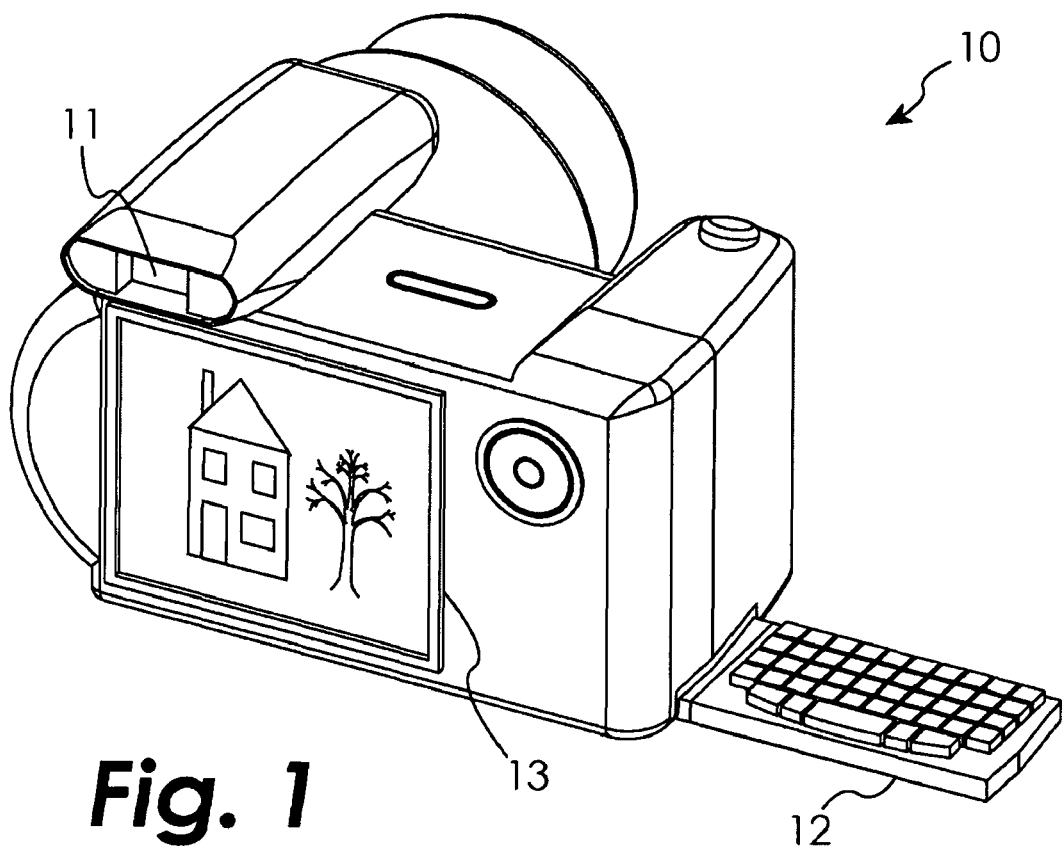
FIG. 1 is a perspective view of a digital camera according to an embodiment of the present disclosure.
Figure 2:
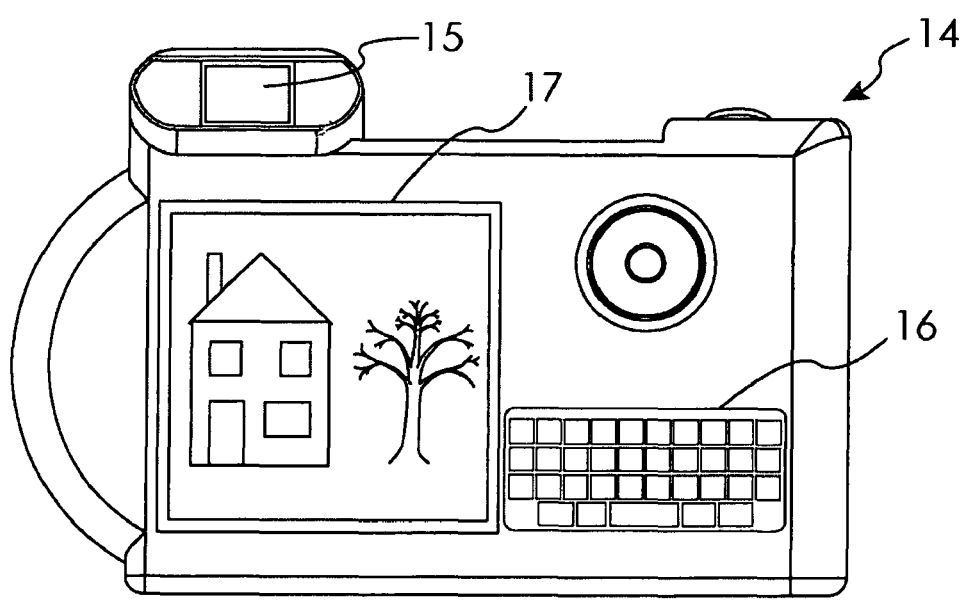
FIG. 2 is a rear view of a digital camera according to another embodiment of the present disclosure.

As illustrated in FIG. 1, the device used to capture the digital image may be a digital camera 10. The design and configuration of digital camera 10 is not critical to the present disclosure. The illustrated camera 10 includes a viewing window 11 and a display screen 13. The digital camera 10 may also include a data entry mechanism to receive customized data input from the user so that the data may be associated with a particular digital image captured by the camera. For example, the data entry mechanism may be an alphanumeric keyboard 12. As illustrated in FIG. 1, the keyboard 12 may be designed to slide or pop out from a stored position within the camera body to be accessible to a user. FIG. 2 illustrates another example keyboard configuration in which keyboard 16 is disposed on an outer surface of digital camera 14. The illustrated camera 14 includes a viewing window 15 and a display screen 17. It should be appreciated that FIGS. 1 and 2 represent only two examples of the numerous possible configurations of the keyboard and arrangements of keys that would occur to one of ordinary skill in the art. In other embodiments, a remote keyboard configured to communicate either wirelessly or via a wired connection with the digital camera may be used.

Figure 3:
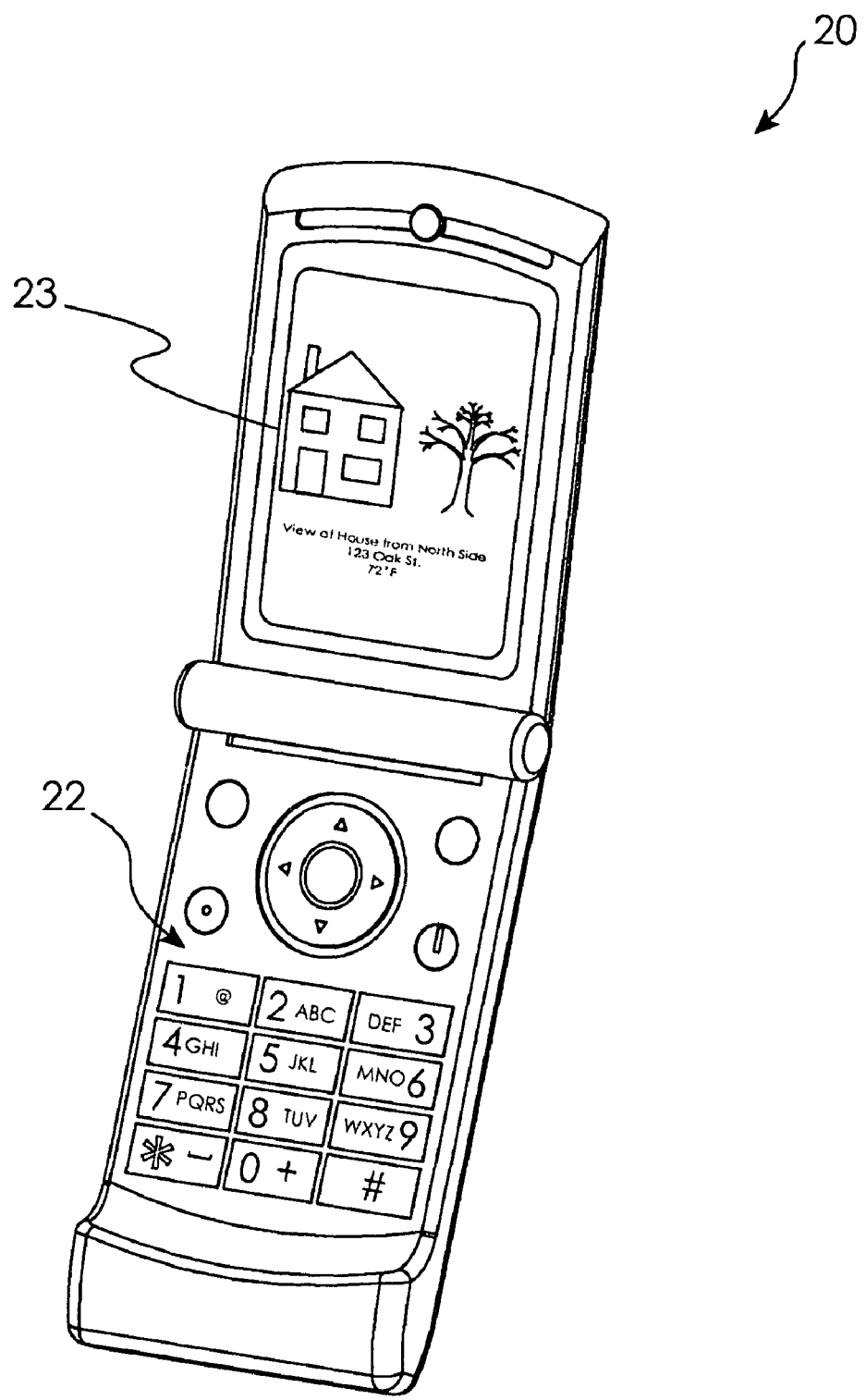
FIG. 3 is a perspective view of a cellular telephone having an onboard digital camera component according to an embodiment of the present disclosure.

As illustrated in FIG. 3, in other embodiments a cellular telephone 20 may be used to capture the digital image, the telephone 20 having a digital camera component integrated into the telephone. The alphanumeric keyboard 22 incorporated into the cellular telephone 20 may be used as the data entry mechanism configured to receive customized data input from the user to be associated with a particular digital image captured by the digital camera component of the telephone 20. It should be appreciated that keyboard 22 may be arranged and configured in a variety of appropriate manners as would occur to one of ordinary skill in the art. Telephone 20 also includes a display screen 23 to display captured digital images. It should be appreciated that the representations in FIGS. 1-3 are for illustrative purposes and are not intended to be detailed drawings showing all the components of digital cameras or cellular telephones. Additionally, the components which are shown are represented in simplified form for ease of understanding.

As discussed above, the data entry mechanism may be an alphanumeric keyboard integrated into the device. However, it should be appreciate that other appropriate data entry mechanisms capable of receiving customized user-supplied data may be used as would occur to one of ordinary skill in the art, including a touch screen device, a handwriting recognition device, a microphone for recording an associated audio file, and/or a voice recognition device, to name a few non-limiting examples. In addition to the data entry mechanism adapted to receive the user-supplied data, the device used to capture the digital image may also include a variety of other components, such as a processor, controller, memory, storage medium, optical sensor, shutter, lens, shutter actuator button, digital display, external port and battery, among many other possible components. For the sake of brevity, much of the standard internal workings, processes and operations of a digital camera or a cellular telephone having an integrated digital camera component will be not be described in detail herein, as they are well-known to those of ordinary skill in the art.

The device used to capture the digital image, such as camera 10, camera 14 or telephone 20, may also include a positioning system integrated into the device, or an associated device, which is capable of determining the location of the device at the time a digital image is captured. After the location information is obtained, it may be associated with the particular digital image, along with the customized user-supplied data input. Alternatively, either the location information or the customized user-supplied data input alone may be associated with the particular digital image, without the other data being obtained and/or recorded. Numerous possible types and arrangements of the positioning systems are contemplated by the present disclosure. In certain embodiments, the device may include an onboard global positioning system ("GPS") operable to determine the location of the device at the time the digital image is captured. The global positioning system may include a database of location information either internal or external to the device. In embodiments in which the database is external to the device, the device may wirelessly communicate with the database to retrieve the location information corresponding to the GPS coordinates, such as through wireless communication on the Internet as an example. For example, the GPS coordinates may be referenced through the database to the nearest city, town, park, sight of interest, etc. The particularity of the location information can range from low resolution (latitude and longitude) to high resolution (street address).

In other embodiments, another real time locating system may be used to determine the location of the device at the time the digital image is captured. For example, a position calculation system, such as cellular triangulation (in which the phone's location is determined by figuring its relative distance from various cell stations), may be used to determine the position or location of the device. In further embodiments, the device may be operable to recognize the location information associated with the nearest wireless internet provider at the time the digital image is captured and store such information with the digital image. The present invention comprehends the use of any other available means to determine the location of the device automatically as would occur to one of ordinary skill in the art.

In certain embodiments, the device may be capable of receiving communications from a wireless internet provider, such as the nearest local business provider through which the device is connecting to the internet. The information received from the wireless internet provider may be associated with one or more digital images captured while receiving communications from the provider. As an example, the wireless internet provider may be a baseball park and the communication transmitted to the device may be the score of the baseball game and/or other information relevant to the status of the game. Such information may be transmitted to the device on a continual basis or intermittently and associated with digital images as they are captured.

In addition to or in lieu of obtaining the location information, the device may also include an ambient sensing system capable of determining or measuring one or more ambient conditions. As examples, the ambient sensing system may be operable to measure one or more of the following ambient conditions: temperature, humidity level, barometric pressure, ultraviolet radiation levels, air quality, noise level, wind speed, and chemical substance levels, just to name a few non-limiting examples. It should be appreciated that the ambient sensing system may be operable to measure other ambient, such as environment or weather conditions, as would occur to one of ordinary skill in the art. The system capable of measuring the ambient condition may be integrated with the positioning or locating system. In other embodiments, the ambient sensing system may be a separate and discrete system, internal or external to the device. Regardless, it should be appreciated that a variety of appropriate systems may be used as would occur to one of ordinary skill in the art. The configuration of such system or component is not critical to the present disclosure. It should be appreciated that in certain embodiments the device may be operable to obtain ambient information and associate only such ambient information (and not user-supplied data or location information) with a digital image captured by the device.

In addition to obtaining the location and/or ambient information, the device may optionally be operable to obtain the date and time information corresponding to the moment the digital image is captured. The system or component capable of determining the date and time information may be the same as or integrated with the location and/or ambient sensing system. In other embodiments, the date and time information system may be a separate and discrete system, internal or external to the device. Regardless, it should be appreciated that a variety of appropriate date and time information systems may be used as would occur to one of ordinary skill in the art. The configuration of such system or component is not critical to the present disclosure.

As mentioned above, each of the digital cameras 10 and 14 and telephone 20, or other appropriate image-capturing device, may include an internal controller to control the operation of the particular device. The controller is operable to automatically associate a captured digital image with customized data input by a user of the device, location information corresponding to the location of the device at the time the digital image is captured, ambient information corresponding to an ambient condition at the time the digital image is captured, and optional date and time information corresponding to the moment the digital image is captured. The data may be automatically associated with the digital image according to protocol stored on the particular image-capturing device. Additionally, each of the digital cameras 10 and 14 and telephone 20, or other appropriate image-capturing device, may include a storage medium where the controller stores the captured digital image with the associated data as a combined data file. The storage medium may be any appropriate storage device used for and capable of storing digital images and associated data. Additionally, the controller may be a variety of appropriate control devices used for and capable of controlling the operations of the particular image-capturing device as would occur to one of ordinary skill in the art.

Systems and methods of storing and displaying data with digital images in accordance with the present disclosure will now be discussed with reference to the flowchart of FIGS. 4A and 4B. Additionally, the systems and methods will be discussed with reference to the digital cameras and cellular telephone described above, but it should be appreciated that the systems and methods contemplated by the present disclosure can be accomplished with a variety of different devices capable of capturing digital images as would occur to one of ordinary skill in the art, cameras 10 and 14 and cellular telephone 20 being just a few non-limiting examples.

As illustrated in FIG. 4, at step 102 a digital image is captured by a capable device, such as a digital camera or cellular telephone having an onboard digital camera component. In typical embodiments, the device receives direction from a user to capture the digital image, such as by depressing an actuator button or similar mechanism. In response to direction from the user, the device captures the digital image according to known techniques and operations. At step 104, the location information corresponding to the particular location of the device and optionally the date and time information is obtained. This information may be obtained through a variety of appropriate techniques, examples of which are discussed above. The obtained information may be automatically associated with the digital image. In certain embodiments, the information is associated with the digital image by the image-capturing device according to protocol stored on the device. In other embodiments, the information is associated with the digital image only when the device is directed to do so by the user. The various possible manners in which the data may be associated with the digital image will be discussed in greater detail below with respect to step 112.

Figure 5:
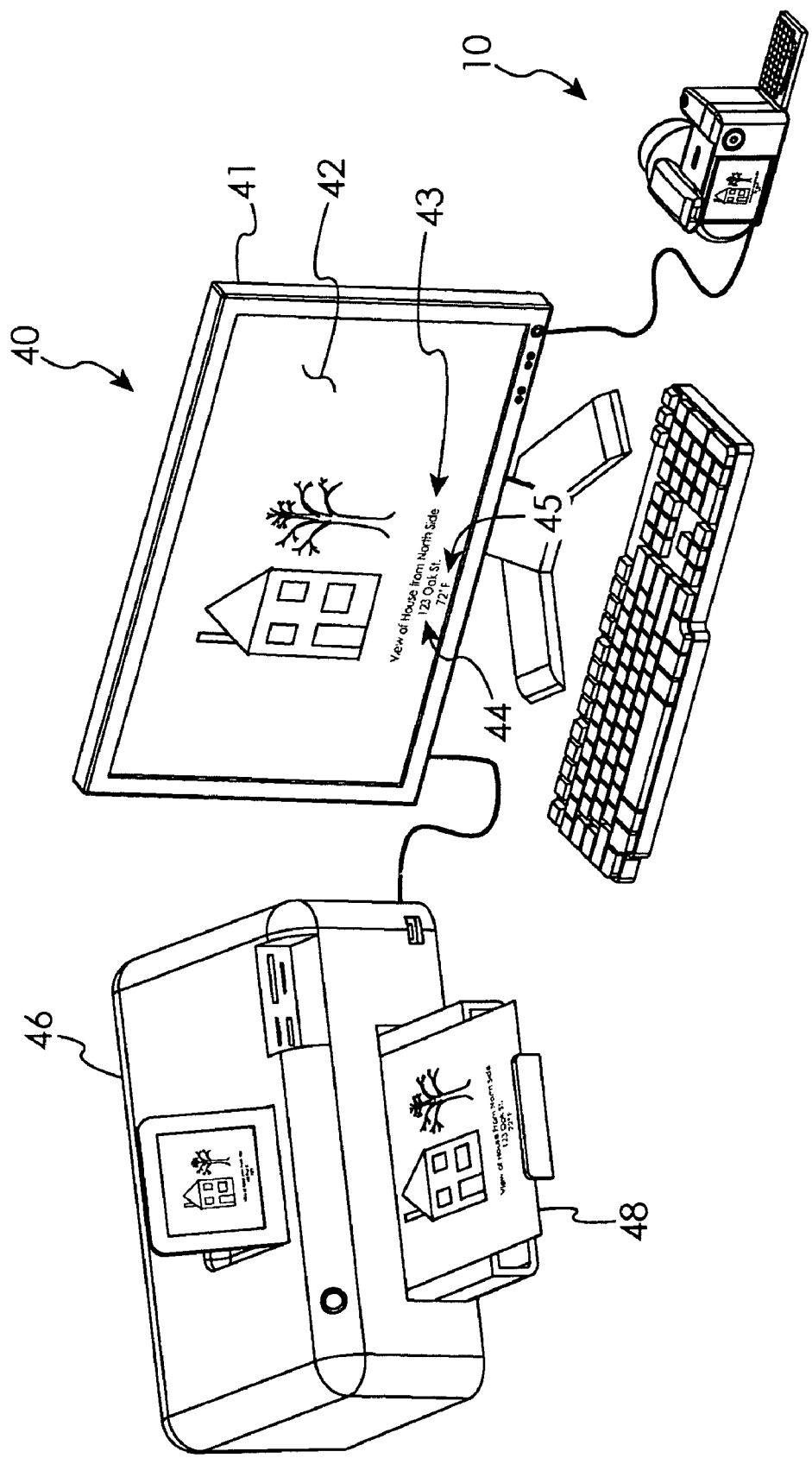
FIG. 5 is a perspective view of a system having a digital camera, computer device and printer according to an embodiment of the present disclosure.

The content of the location information may be any type of location or position data that would occur to one of ordinary skill in the art and is not critical to the present disclosure. As non-limiting examples, the location or position data may be the corresponding or nearest street address, town, city, state, country, landmark, major attraction site, and/or the corresponding latitude and longitude coordinates. As the example shown in the accompanying figures depicts, the user may photograph a structure such as a residential home, with the associated location information being the street address for the structure, such as "123 Oak St.," labeled the location information data 44 in at least FIG. 5.

In some embodiments, the positioning system may be global positioning system (or other appropriate system) which is operable to provide the geographic coordinate information corresponding to the position of the camera at the time the digital image is captured. Based on the geographic coordinate information, the digital camera may be operable to retrieve information representing the nearest landmark and associate such landmark information with the digital image. In certain embodiments, the digital camera may be operable to communicate wirelessly with a global computer network system to retrieve the information representing the nearest landmark based on the geographic coordinates. The geographic coordinate information and/or the nearest landmark may be associated with the digital image and displayed with respect to the digital image in numerous possible ways, including those discussed in greater detail below.

At step 106, ambient information may optionally be measured and automatically associated with the digital image, the ambient information corresponding to the level of an ambient condition present at the time the digital image is captured in step 102. This information may be obtained through a variety of appropriate techniques and systems. The obtained ambient information may be automatically associated with the digital image. In certain embodiments, the information is associated with the digital image by the image-capturing device according to protocol stored on the device. In other embodiments, the information is associated with the digital image only when the device is directed to do so by the user. The various possible manners in which the data may be associated with the digital image will be discussed in greater detail below with respect to step 112.

The content of the ambient information may be any type of ambient condition level would occur to one of ordinary skill in the art and is not critical to the present disclosure, with numerous non-limiting examples mentioned above. As the example shown in the accompanying figures depicts, the device may measure the ambient temperature to which the device is exposed at the time the digital image is captured, such as "72° F." for example, labeled the ambient information data 45 in at least FIG. 5, and associate the temperature information with the digital image.

Optionally, at step 108, the device capturing the digital image may prompt the user to supply customized data to be associated with the digital image. In certain embodiments, the device may be designed to prompt the user to supply data after the digital image is captured. The device may prompt the user following the capture of each digital image. In other embodiments, the device may prompt the user at a variety of other appropriate times or events, such as prompting the user at the time the user turns off the camera to supply data for each digital image captured while the device has been activated, as one non-limiting example. In other embodiments, the device may be designed to prompt the user to supply data before the digital image is captured, or both before and after capturing the digital image. In some embodiments, step 108 is absent and the user initiates the supply of data to be associated with the digital image before or after the digital image is captured. In other embodiments, the user does not supply data and the device only stores the location information (and optionally the date and time information).

At step 110, the user optionally supplies customized data to be associated with the digital image. As mentioned above, the user-supplied data may be received by the device before and/or after the particular digital image is captured and may be received in response to prompting by the device or on a user-initiated basis. The data supplied by the user in accordance with the present disclosure may be received from a variety of possible sources, input in a variety of different manners, and relate to a variety of different subjects. The user may input data through an appropriate data entry mechanism, including alphanumeric keyboard 12, 16 and/or 22, a touch screen device, a handwriting recognition device and/or a voice recognition device, to name a few non-limiting examples. The particular data entry mechanism may be integrated within the device capturing the digital image or may be separate from the device and operable to communicate with the device wirelessly or through a wired connection. As an example, the data supplied from the user may be typed into a separate alphanumeric keyboard operable to communicate wirelessly with the device capturing the digital image. As another example, the data supplied from the user may be typed into the alphanumeric keyboard of a cellular phone and wirelessly transmitted to a digital camera. As a further example, the user may record an audio file to be stored with the digital image (and later played while the image is displayed), such as by speaking into a microphone integrated with the device or a separate microphone coupled to the device by a wired or wireless connection.

The user-supplied customized data may be received from other sources and entered into the device via other means, such as the transmission of data retrieved from a computer network system. In such embodiments, the user can select and retrieve data from a computer network system, such as the Internet as an example, through wired or wireless system communication with the device. The selected data can be retrieved from the computer network system and associated with the digital image by the controller component of the device responsible for capturing the digital image. In certain embodiments, the user can wirelessly retrieve information from the Internet including weather information, current events information or mapping locations, just to name a few non-limiting examples, so that the retrieved data may be associated with the digital image.

In other embodiments, the user-supplied data may be selected from a pool of potential data entries stored on the device capturing the digital image. As an example, the device may include a list of possible text entries for the user to choose from to be associated with the particular digital image. Such entries may be provided on the image-capturing device upon manufacture and/or may be entered in by a user of the device.

The content of the customized data supplied from the user may be any data that the user would like to associate with a digital image and is not critical to the present disclosure. As non-limiting examples, the data may be human-readable text including letters and numbers, symbols, and/or watermarking imprints. In certain embodiments, the presently-disclosed systems and methods may be beneficial to users photographing a structure, such as residential home or office building, for insurance, appraisal and/or real estate marketing purposes. In such situations, the user may input location-specific customized data corresponding to the particular view of the structure shown in the digital image. As the example shown in the accompanying figures depicts, the user may photograph a structure such as a residential home and enter in user-supplied data corresponding to the particular view, such as "View of House from North Side," labeled the user-supplied customized data input 43 shown in at least FIG. 5. There are numerous other circumstances in which supplying customized data to be associated with a digital image may be particularly useful, including amateur and professional photographers interested in taking note of the particular camera settings used when capturing a digital image. As one example, beginning photographers may be interested in entering in data such as the shutter speed and/or brightness used when capturing the digital image and having that information associated with the digital image for future reference by the beginning photographer. As another example, the user may want to enter the names of persons appearing in the photograph.

At step 112, the controller or similar component of the device capturing the digital image automatically associates the user-supplied data input with the digital image. Additionally, at step 114, the controller stores the digital image, the user-supplied data (if any), the location information and the ambient information together as a combined data file. In certain embodiments, the controller is designed to receive or obtain the user-supplied data input, the location information and the ambient information and associate such data with the designated digital image according to protocol stored on the device. In certain embodiments, the automatic data-to-image association may be based on a temporal relationship between the receipt of user-supplied customized data input and the capturing and storing of the digital image. As one non-limiting example, in a particular embodiment the device may be configured such that user-supplied data input is automatically associated with the most-recently captured digital image. In other embodiments, the automatic data-to-image association may occur based on the user selecting the digital image to which the data input is to be associated. As an example, the device may be configured and operable to automatically associate the user-supplied data input with the particular digital image shown on the display screen of the device at the time the data input is entered. As another example, the digital images captured and stored on the device may be numbered, with the user entering in the particular digital image number to which the user-supplied data input is to be associated. In other embodiments, the user-supplied data input may be associated with two or more digital images as directed by a user.

There are various appropriate manners in which the user-supplied data input, the location information and the ambient information may be combined with the digital image file. As one example, exchangeable image file format ("Exif") may be used to store the data in the digital image file. Additionally, the data and the digital image may be stored in a single data file or may be stored separately, with data associated with the digital image file. In embodiments in which the data is stored separately, appropriate frameworks for storing the data may be employed, such as extensible markup language ("XML") or another appropriate system. It should be appreciated that there are numerous manners in which the data may be associated with one or more particular digital images according to numerous different appropriate procedures, with the above descriptions being just a few non-limiting examples.

Figure 6:
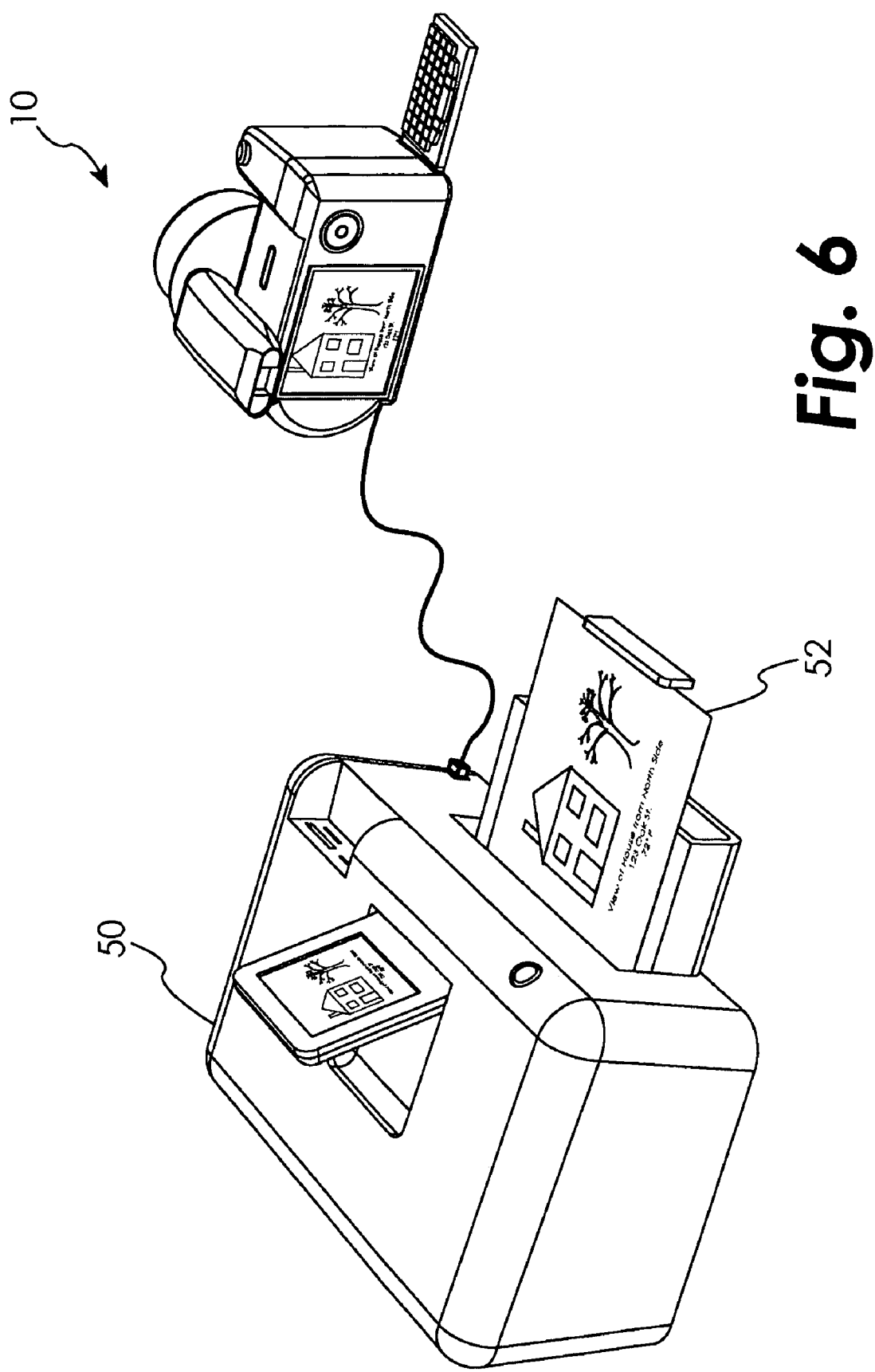
FIG. 6 is a perspective view of a system having a digital camera and printer according to an embodiment of the present disclosure.

Optionally, the combined data file may be uploaded to a computer device at step 116, such as a general-purpose personal computer. As an example shown in FIG. 5, digital camera 10 may be connected with computer device 40 which is connected with photo printer 46 for printing of photo 48. In the illustrated embodiment, computer device 40 includes a monitor 41 having a display screen 42 for displaying the digital image and associated data. In other embodiments, the device may be directly connected to a printer for printing of the digital image and associated data. As an example shown in FIG. 6, digital camera 10 may be connected with photo printer 50 for printing of photo 52 showing the digital image and associated data. In yet other embodiments, the device may communicate with a global computer network system, such as the Internet to upload the combined data file to the system for viewing, formatting, printing and/or transmitting to other parties.

Following the optional uploading to a computer device, the display position of the user-supplied data input, the location information and the ambient information with respect to the corresponding digital image is established. As illustrated in FIG. 4B, there are at least three options, represented as optional steps 118a through 118c, for establishing the display location or positioning of the data. However, it should be appreciated that there are numerous other appropriate manners to establish the display location of the data as would occur to one of ordinary skill in the art, in addition to the three non-limiting examples discussed below. In certain embodiments, the optional date and time information, if available, may optionally be displayed along with the location information, the ambient information and/or the user-supplied data input at the same position(s). In other embodiments, the date and time information may be displayed at a different position from the user-supplied data input, the location information and/or the ambient information. In even other embodiments, the date and time information is not displayed. While the following discussion pertains to the display location or positioning of the user-supplied data input, the location information and the ambient information, it should be appreciated that the date and time information may optionally also be displayed with respect to the digital image according to the same or similar procedures.

At step 118a, the user may be provided with two or more choices for the display location or positioning of the data with respect to the corresponding digital image and prompted to make a selection. Thereafter, at step 120 the user selects one of the choices for the display location of the data. In certain embodiments, there may be separate choices for the display location of the user-supplied data input, the location information and the ambient information. However, in other embodiments, the user-supplied data input, the location information and the ambient information may be displayed together at the same location and therefore are joined together with respect to the choices presented at step 118a. In yet other embodiments, the display location or positioning of one of the user-supplied data input, the location information and/or the ambient information may be determined in accordance with one of steps 118a through 118c and the display location of the other sets of data may be determined in accordance with others of steps 118a through 118c.

In certain embodiments, the display location of the data may be automatically determined at step 118b. The automatically designated display location may be determined by the device capturing the digital image or a computer device to which the combined data file is uploaded, or may be predetermined by a user of the system. Additionally, the designated display location may be the same for all digital images having associated data or may vary based on a variety of factors, including the layout of the image and/or the positioning of objects within the digital image. In yet other embodiments, at step 118c the user may initiate the determination of how the data is displayed and be provided with the ability to position the data with respect to the digital image in a variety of manners and at a variety of positions.

In some embodiments, the data is positioned at a location that does not interfere with the digital image. More specifically, the data may be positioned so as not to impede and/or consumer a portion of the pixels dedicated to the digital image. In such embodiments, the data may be displayed above, below or to the side of the digital image, leaving the maximum number of pixels available for the digital image, thereby allowing for better quality and higher resolution of the digital image.

Figure 7:
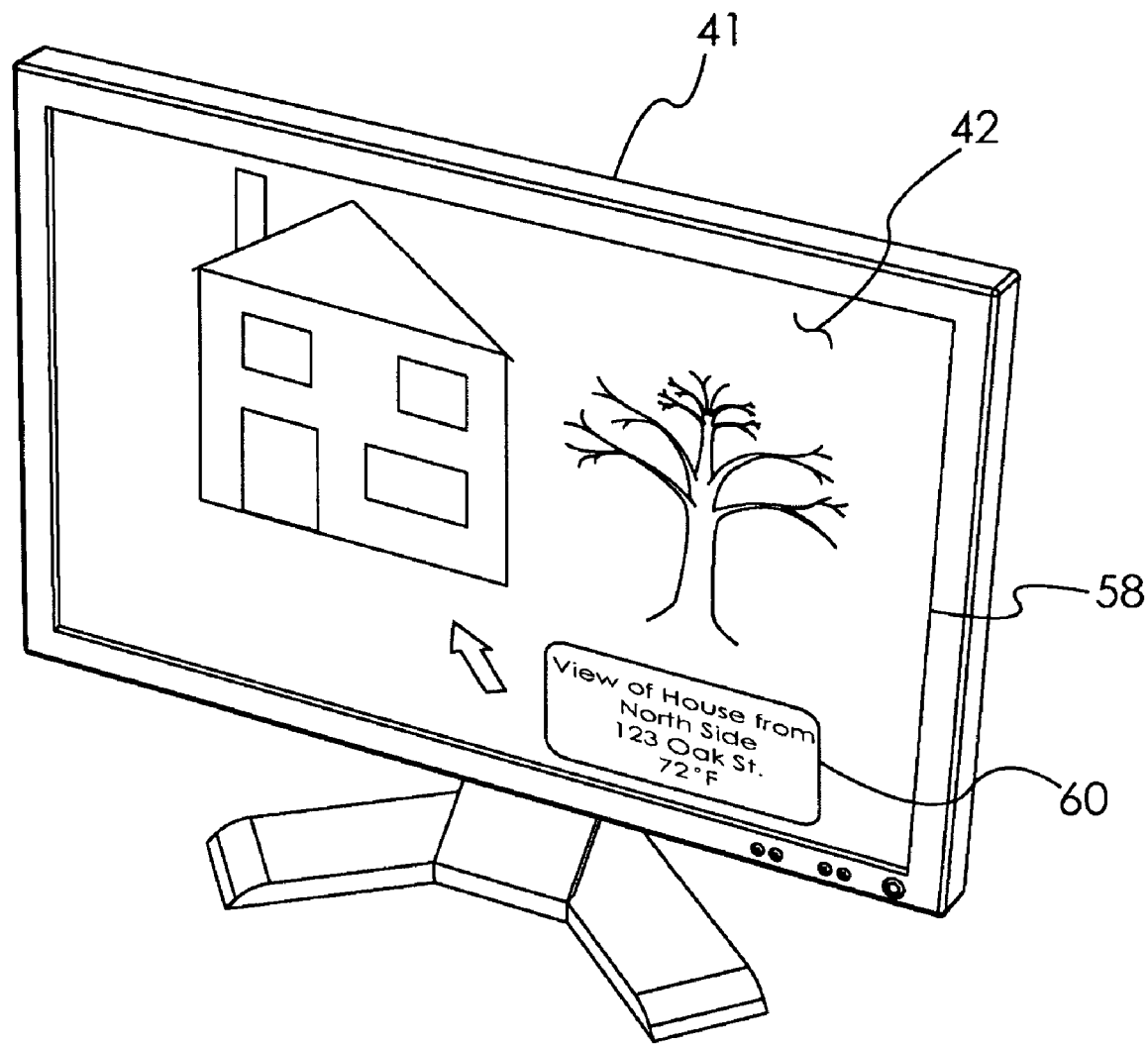
FIG. 7 is a perspective view of a monitor for a computer device according to an embodiment of the present disclosure.

In accordance with steps 118a through 118c, the user-supplied data input, the location information and/or the ambient information may be displayed at a variety of possible locations with respect to the digital image. As non-limiting examples, the data may be displayed on the back or reverse side of the printed digital image, on the front of the digital image at any position, on both the front and back, or omitted and not displayed. As another example, the data may be configured to scroll across the digital image during viewing of the combined data file on the image-capturing device and/or the computer device. As yet another example, the data may be configured as a pop-up window which appears on the computer monitor in response to the user activating the pop-up window, such as by clicking on the digital image. As shown in FIG. 7, clicking on or selecting the digital image 58 may cause a pop-up window 60 to be displayed which contains the data for viewing. The pop-up window may print on the digital image when the combined data file is printed or may only be available for viewing on the computer monitor.

In certain embodiments, at step 118a, 118b or 118c, or at another appropriate step contemplated by the present disclosure, the user may also have the option of selecting whether the data is available only for viewing, only for printing, or available for both. In other words, the user may designate that the data is only viewable with the digital image on the device which captured the digital image and/or the computer device, is only printed with respect to the digital image but not viewable, or is both viewable and printed along with the digital image. In certain embodiments, the viewing and printing options for the user-supplied customized data, the location information and the ambient information may differ, such that the user may select that one set of data is printed with the respect to the digital image while another set of data is not. In alternative embodiments, the determination of whether the data is available for viewing and/or printing is established by the device which captured the digital image and/or the computer device, according to predetermined protocol.

Upon the establishment of the display location of the data, at step 122 the user may optionally edit and/or format the combined data file in a variety of possible manners and in accordance with a variety of possible editing techniques and procedures as would occur to one of ordinary skill in the art. In certain embodiments, the computer device may be operable to execute a digital image formatting program which the user can engage to format the digital image and/or the user-supplied data. As an example, the user may be able to edit the size, font and/or layout of the data input. In some embodiments, once the display location of the data is established at step 118a, 118b or 118c, the data may not be edited or formatted, with only the digital image being available to formatting at step 122. In certain embodiments, steps 122 and 118c may be combined into a single step allowing for user-initiated editing and formatting of the combined data file. Additionally, it should be appreciated that in embodiments in which step 116 is absent and the combined data file is not uploaded to a computer device, the device which captured the digital image, such as the digital camera or cellular telephone, may be configured and operable to execute or participate in the execution of steps 118a, 118b, 118c, 120 and 122 without the need for a computer device.

At step 124, the combined data file may optionally be printed. Accordingly, the digital image and associated data may be printed onto paper via a printer, such as printers 46 and/or 50 as examples, in accordance with known printing techniques. The data may be printed at the display location with respect to the digital image as determined in step 118a (along with step 120), step 118b, or step 118c. Alternatively to printing, the combined may be transferred in other manners and/or via other media. As examples, the combined data file may be sent to a third party via email or uploaded to an internet webpage.

Figure 8:
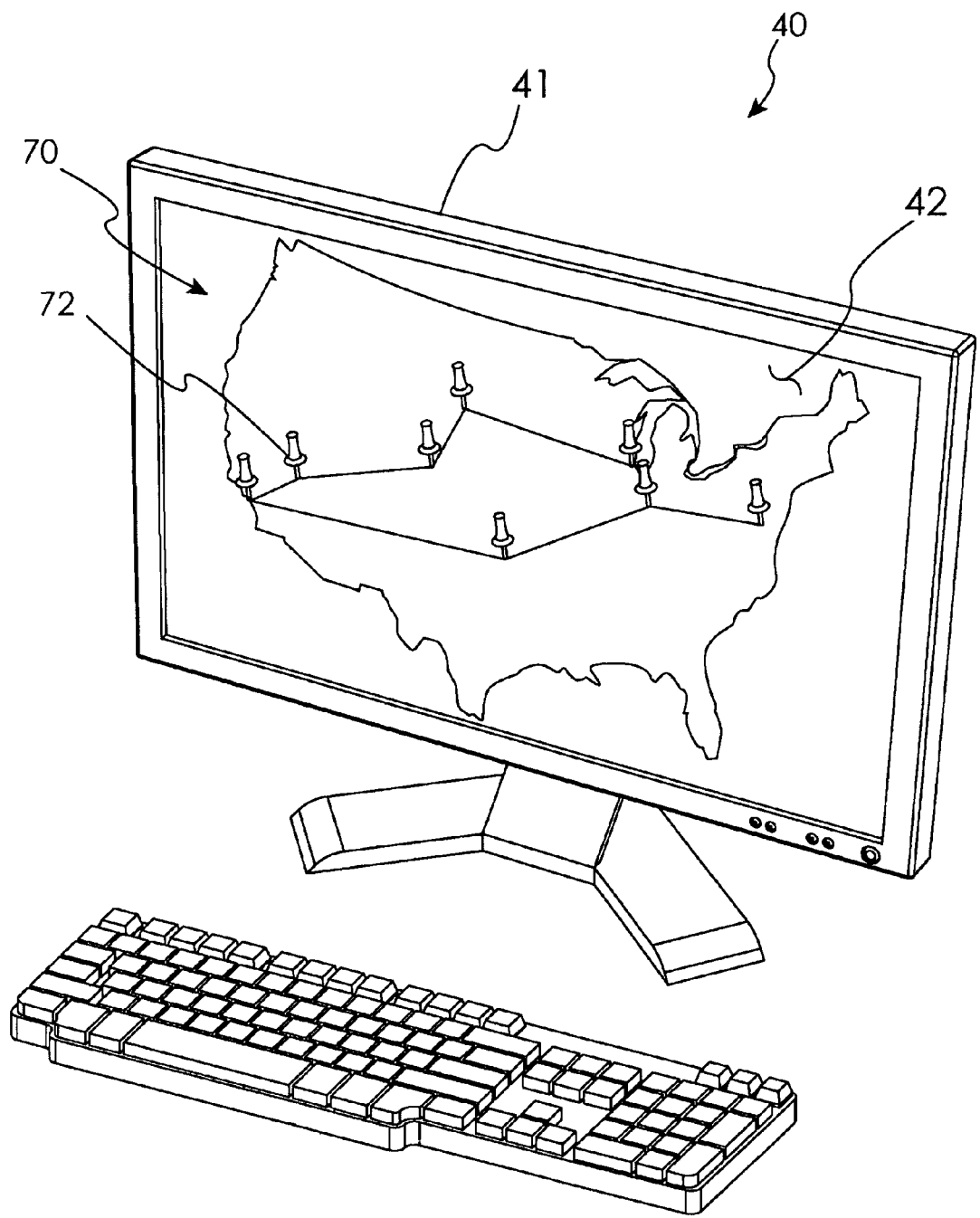
FIG. 8 is a perspective view of a monitor for a computer device according to another embodiment of the present disclosure.

Uploading of the digital image files with embedded location information allows for the provision of additional functions on the user's computer device 40. For example, the computer device 40 may display a map with locations marked upon the map where images stored on the computer device 40 have been captured. For example, a map of the United States 70 may have such locations marked with a representation of a push pin 72, as shown in FIG. 8, emulating a physical map into which push pins have been inserted to mark locations where the user has been. For image files that contain date and time information, location marks representing images captured at successive times may be connected by lines, as shown in the illustrated example, thereby drawing upon the map a route that was traveled by the user when creating the digital images. In some embodiments, a thumbnail of the image may be displayed next to the location marker on the map. In other embodiments, clicking a mouse on the location marker (or otherwise activating the feature) will cause the associated image to be displayed on the display 42.

In addition to still digital images, it is contemplated that the methods and systems presently disclosed may apply to live motion video as well. The user-supplied data, location information and/or ambient information could be associated with the video at specific points in time along the captured video. In such embodiments, the associated data may progress or change through time as the video progresses. Such data may be associated with the video and displayed with respect to the video in numerous possible ways and according to numerous possible protocols, many of which are discussed above with reference to FIGS. 4A and 4B.

In certain optional embodiments, the device may include an onboard or internal compass component operable to obtain directional information corresponding to the direction the image-capturing device is facing or pointing at the moment the digital image is captured. The directional information may be associated with the digital image and displayed with respect to the digital in numerous possible ways, including those discussed above with respect to FIGS. 4A and 4B. The compass system or component capable of determining the direction the camera device is facing may be the same as or integrated with the location system. In other embodiments, the compass component may be a separate and discrete system, internal or external to the device. Regardless, it should be appreciated that a variety of appropriate systems or components may be used as would occur to one of ordinary skill in the art. The configuration of such system or component is not critical to the present disclosure.

While the disclosure has been illustrated and described in detail in the drawings and foregoing description, the same is to be considered as illustrative and not restrictive in character, it being understood that only the preferred embodiment has been shown and described and that all changes and modifications that come within the spirit of the disclosure are desired to be protected.

What is claimed is:

1. A method for storing data with a digital image, comprising:
    (a) providing a digital camera for capturing and storing digital images, the digital camera having a controller, a storage medium, a data entry mechanism adapted to receive user-supplied data, and a positioning system;
    (b) the camera receiving direction from a user to capture a digital image;

(c) the camera capturing and storing the digital image in response to the user's direction in step (b);

(d) the positioning system determining location information corresponding to the location of the digital camera at step (c);

(e) the camera receiving user-supplied data input to be associated with the digital image captured in step (c) via the data entry mechanism; and (f) the controller automatically associating the user-supplied data input and the location information with the digital image and storing the data input, the location information, and the digital image in the storage medium as a combined data file.

2. The method of claim 1, further comprising providing the user with two or more choices for a display location of the data input and the location information with respect to the digital image and prompting the user to make a selection between the choices.

3. The method of claim 1, wherein the controller automatically associates the user-supplied data input with the digital image in step (f) based on a temporal relationship between the camera receiving the user-supplied data input in step (e) and the camera capturing and storing the digital image in step (c).

4. The method of claim 1, further comprising uploading the combined data file to a computer device and formatting the digital image and the associated data input and location information using a digital image formatting program executed by the computer device.

5. The method of claim 4, wherein the formatting includes the user positioning the data input and location information at one or more desired locations with respect to the digital image.

6. The method of claim 1, wherein the digital camera is a component of a cellular telephone.

7. The method of claim 1, wherein the data entry mechanism is selected from the group consisting of an alphanumeric keyboard, a touch screen device, a microphone, a voice recognition device and a handwriting recognition device.

8. The method of claim 1, wherein the positioning system is a global positioning system having an associated database of location information and step (d) includes accessing the database to retrieve the corresponding location information.

9. The method of claim 8, wherein the database is internal to the global positioning system.

10. The method of claim 1, wherein the user-supplied data input is human readable text and the location information is selected from the group consisting of the street address, the nearest city, the nearest town, the country, the nearest landmark and the latitude and longitude coordinates.

11. The method of claim 1, further comprising uploading the combined data file to a computer device, wherein the computer device is operable to display a map and display an indicator on the map corresponding to the location information.

12. A method for storing data with a digital image, comprising:

(a) providing a cellular telephone having a controller, a storage medium, and an onboard digital camera component capable of capturing and storing digital images;

(b) the telephone receiving direction from a user to capture a digital image;

(c) the digital camera component capturing and storing the digital image in response to the user's direction in step (b);

(d) the telephone obtaining location-identifying information corresponding to the location of the telephone at step (c);

(e) the telephone receiving user-supplied data input to be associated with the digital image captured in step (c); and (f) the controller automatically associating the user-supplied data input and the location identifying information with the digital image and storing the data input, the location information and the digital image in the storage medium as a combined data file.

13. The method of claim 12, wherein the telephone is capable of communicating wirelessly with a global computer network system and the user-supplied data input is human readable text retrieved from the global computer network system.

14. The method of claim 12, wherein the telephone includes an onboard global positioning system having an associated database of location information and step (d) includes accessing the database to retrieve the corresponding location-identifying information.

15. The method of claim 12, wherein the location-identifying information represents the nearest wireless internet provider.

16. The method of claim 12, wherein the location-identifying information is determined using a signal triangulation technique.

17. A system for storing data with a digital image, comprising:

a digital camera adapted and configured for capturing and storing digital images, the digital camera having a controller, a storage medium, and a data entry mechanism adapted to receive user-supplied data, wherein the camera is operable to obtain location information representing the location of the digital camera at the time a digital image is captured, wherein the camera is operable to receive user-supplied data input via the data entry mechanism, and wherein the controller is operable to automatically associate the data input and the location information with the digital image and store the data input, the location information, and the digital image in the storage medium as a combined data file;

a computer device adapted and configured for receiving the combined data file uploaded from the digital camera, wherein the computer device is operable to receive direction from the user for the display location of the data input and location information with respect to the digital image; and a printer for printing the digital image with the associated data input and location information on paper.

18. The system of claim 17, wherein the data entry mechanism is selected from the group consisting of an alphanumeric keyboard, a touch screen device, a microphone, a voice recognition device and a handwriting recognition device.

19. The system of claim 17, wherein the computer device is operable to display a map and display an indicator on the map corresponding to the location information.

20. The system of claim 17, wherein the digital camera further includes an ambient sensing system and wherein the camera is operable to obtain ambient information corresponding to at least one ambient condition at the time the digital image is captured.

21. A method for storing data with a digital image, comprising:

(a) providing a digital camera for capturing and storing digital images, the digital camera having a controller, a storage medium, and an ambient sensing system;

(b) the camera receiving direction from a user to capture a digital image;

(c) the camera capturing and storing the digital image in response to the user's direction in step (b);
(d) the ambient sensing system determining ambient information corresponding to at least one ambient condition at the time the digital image is captured at step (c); and
(e) the controller automatically associating the ambient information with the digital image and storing the ambient information and the digital image in the storage medium as a combined data file.

22. The method of claim 21, further comprising determining location information corresponding to the location of the digital camera at step (c), wherein the digital camera includes a positioning system capable determining the location information.

23. The method of claim 22, wherein the positioning system is a global positioning system having an associated database of location information and step (d) includes accessing the database to retrieve the corresponding location information.

24. The method of claim 23, wherein the database is internal to the global positioning system.

25. The method of claim 22, further comprising uploading the combined data file to a computer device, wherein the computer device is operable to display a map and display an indicator on the map corresponding to the location information.

26. A method for storing data with a digital image, comprising:
(a) providing a digital camera for capturing and storing digital images, the digital camera having a controller, a storage medium, and a positioning system;
(b) the camera receiving direction from a user to capture a digital image;
(c) the camera capturing and storing the digital image in response to the user's direction in step (b);
(d) the positioning system determining geographic coordinate information corresponding to the geographic location of the digital camera at step (c);
(e) the digital camera retrieving information representing the nearest landmark based on the geographic coordinate information; and
(f) the controller automatically associating the landmark information with the digital image and storing the landmark information and the digital image in the storage medium as a combined data file.

27. The method of claim 26, further comprising the digital camera communicating wirelessly with a global computer network system, wherein the information representing the nearest landmark is retrieved from the global computer network system.

28. The method of claim 26, wherein the positioning system is a global positioning system.

* * * * *